US009555738B2

(12) United States Patent
Oh

(10) Patent No.: US 9,555,738 B2
(45) Date of Patent: Jan. 31, 2017

(54) AUDIO CONTROL SYSTEM AND METHOD FOR A VEHICLE HAVING A WARNING FUNCTION

(71) Applicant: Hyundai Motor Company, Seoul (KR)

(72) Inventor: Se Min Oh, Seoul (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 14/458,648

(22) Filed: Aug. 13, 2014

(65) Prior Publication Data

US 2015/0116104 A1 Apr. 30, 2015

(30) Foreign Application Priority Data

Oct. 29, 2013 (KR) ........................ 10-2013-0129359

(51) Int. Cl.

| | |
|---|---|
| ***G08B 21/00*** | (2006.01) |
| ***B60Q 5/00*** | (2006.01) |
| ***B60Q 9/00*** | (2006.01) |
| ***H04R 5/04*** | (2006.01) |
| *B60W 50/14* | (2012.01) |
| *H04R 3/12* | (2006.01) |

(52) U.S. Cl.

CPC ............... *B60Q 5/005* (2013.01); *B60Q 9/002* (2013.01); *B60Q 9/008* (2013.01); *H04R 5/04* (2013.01); *B60W 2050/143* (2013.01); *H04R 3/12* (2013.01)

(58) Field of Classification Search

CPC ...................................................... B60Q 5/005

USPC ........... 340/384.7, 354.1, 425.5, 438; 701/36

See application file for complete search history.

(56) References Cited

U.S. PATENT DOCUMENTS

2005/0261815 A1* 11/2005 Cowelchuk ........... B60R 16/037 701/36

FOREIGN PATENT DOCUMENTS

| | | |
|---|---|---|
| JP | 2007-328603 A | 12/2007 |
| JP | 2009090848 A | 4/2009 |
| KR | 10-0527894 | 11/2005 |
| KR | 10-2006-0026339 | 3/2006 |
| KR | 10-2010-0125608 | 12/2010 |

* cited by examiner

*Primary Examiner* — Jeffery Hofsass

(74) *Attorney, Agent, or Firm* — Mintz Levin Cohn Ferris Glovsky and Popeo, P.C.; Peter F. Corless

(57) ABSTRACT

A control system and method for a vehicle having a warning function are provided. The system includes a control device that is configured to determine whether an amplifier is installed within the vehicle based on an occurrence of an alert situation. The control device is configured to transmit an alarm sound to an amplifier when the amplifier is installed therein and transmit the alarm sound to a cluster speaker when the amplifier is not installed within the vehicle. The amplifier is configured to transmit amplifier installation information to the control device and output an alarm sound received from the control device and the cluster speaker is configured to output the alarm sound received from the control device.

8 Claims, 3 Drawing Sheets

AUDIO CONTROL SYSTEM AND METHOD FOR A VEHICLE HAVING A WARNING FUNCTION

CROSS-REFERENCE TO RELATED APPLICATION

This application is based on and claims priority from Korean Patent Application No. 10-2013-0129359, filed on Oct. 29, 2013 in the Korean Intellectual Property Office, the disclosure of which is incorporated herein in its entirety by reference.

BACKGROUND

Field of the Invention

The present invention relates to a control system and a method for a vehicle having a warning function, and more particularly, to a technique of determining whether an amplifier is installed within a vehicle and outputting an alarm sound to an amplifier or a cluster speaker based on an occurrence of an alert situation.

Description of the Prior Art

Due to prevalence of vehicles settled as daily essentials and an accompanying increase in traffic accidents, consumer demand for more stable and intelligent vehicles and the development of vehicle-related industry are grafted to develop an intelligent safety system that secures stable running characteristics even under conditions of snow, fog, heavy rain, and the like. As auxiliary devices for safety driving, a lane departure prevention system, drowsy driving prevention system, a collision prevention system by securing a safety distance have been developed and applied to vehicles.

Meanwhile, recently, a pedestrian sensing device configured to sense and display a pedestrian has been installed to be used in vehicles as one of safety running auxiliary device. Various vehicle control systems are configured to output an alarm sound to inform a driver about a dangerous situation. However, such vehicle control systems do not have a function of detecting an amplifier installed within a vehicle and output an alarm sound to a cluster speaker, in spite of the presence of an amplifier.

SUMMARY

Accordingly, the present invention provides a control system and a method for a vehicle having an warning function that provides an optimum alarm sound to a driver by determining whether an amplifier is installed within a vehicle and outputting an alarm sound to an amplifier or a cluster speaker based on an occurrence of an alert situation.

In one aspect of the present invention, a control system for a vehicle having a warning function may include: a control device configured to determine whether a vehicle has an amplifier installed therein based on an occurrence of an alert situation, transmit an alarm sound to an amplifier when the vehicle has an amplifier installed therein, and transmit the alarm sound to a cluster speaker when an amplifier is not installed within the vehicle; an amplifier configured to transmit amplifier installation information to the control device and output an alarm sound received from the control device; and a cluster speaker configured to output the alarm sound received from the control device.

In another aspect of the present invention, a control method for a vehicle having a warning function may include: when an alert situation occurs, determining whether a vehicle has an amplifier installed therein; when the vehicle has an amplifier according to the determination result, transmitting an alarm sound to the amplifier; outputting, by the amplifier, the alarm sound; when the vehicle does not have an amplifier according to the determination result, transmitting the alarm sound to a cluster speaker; and outputting, by the cluster speaker, the alarm sound.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit/control device refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit/control device or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Figure 1:
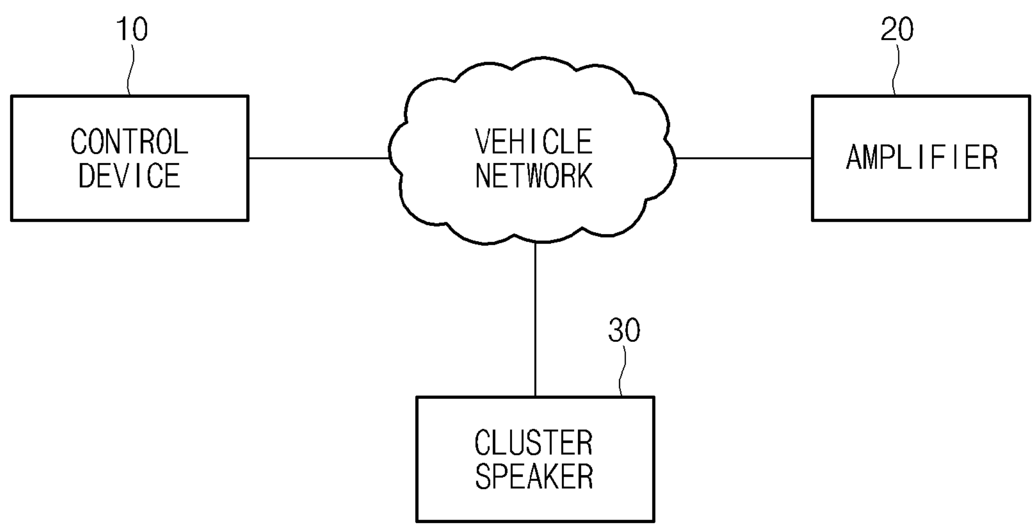
FIG. 1 is an exemplary view illustrating a configuration of a control system for a vehicle having a warning function according to an exemplary embodiment of the present invention.

FIG. 1 is an exemplary view illustrating a configuration of a control system for a vehicle having a warning function according to an exemplary embodiment of the present invention. As illustrated in FIG. 1, a control system for a vehicle having a warning function may include a control device 10, an amplifier AMP 20, and a cluster speaker 30. The control device 10, the amplifier 20, and the cluster speaker 30 may be connected via a vehicle network to transmit and receive data to and from each other, and when a specific component uses a heterogeneous network, a gateway configured to perform a relay function may be provided. The vehicle network may include a controller area network (CAN), a local interconnection network (LIN), FlexRay, media oriented system transport (MOST), and the like.

Referring to the respective elements, first, when an alert situation occurs, the control device 10 may be configured to transmit an alarm sound to the amplifier 20 or the cluster speaker 30. In particular, when the vehicle network is activated, the control device 10 may be configured to receive amplifier installation information (AMP_INFORM_TO_IPM) from the amplifier 20 to detect whether a vehicle has the amplifier 20 installed therein. When the amplifier 20 is not installed within the vehicle, the control device 10 may be configured to receive no amplifier installation information, and determine that an amplifier is not installed within the vehicle.

In transmitting an alarm sound to the amplifier 20, the control device 10 may be configured to transmit speaker position information (e.g., left/right front speakers, left/right front door speakers, left/right rear door speakers, left/right rear speakers, and the like) to allow the alarm sound to be output via speakers at the corresponding positions. When an amplifier 20 is not installed within the vehicle, the control device 10 may be configured to transmit the alarm sound to the cluster speaker 30. In particular, speaker position information is not required when the alarm sound is transmitted to the cluster speaker 30, and thus the control device 10 may not be configured to transmit speaker position information.

In general, the cluster speaker 30 may be a component installed many vehicles, while the amplifier 20 is a device optionally installed within vehicles according to a purchaser's selection. Thus, when the amplifier 20 is installed within the vehicle, the control device 10 may be configured to transmit the alarm sound including speaker position information to the amplifier 20, and when the amplifier 20 is not installed within the vehicle, the control device 10 may be configured to transmit only the alarm sound to the cluster speaker 30. In particular, the control device 10 may be configured to transmit the alarm sound to both the amplifier 20 and the cluster speaker 30 when an amplifier 20 is installed within the vehicle. Additionally, to avoid confusion with respect to a different control device installed within the vehicle, the control device 10 may be configured to store an alarm sound having different tones. Therefore, a difference between tones may indicate a difference between frequencies of sounds.

The amplifier 20 may be configured to output the alarm sound received from the control device 10. In particular, the amplifier 20 may be configured to output the alarm sound through corresponding speakers (e.g., one or more of left/right front speakers, left/right front door speakers, left/right rear door speakers, and left/right rear speakers) based on the received speaker position information. The cluster speaker 30 may be configured to output the alarm sound received from the control deice 10.

Figure 2:
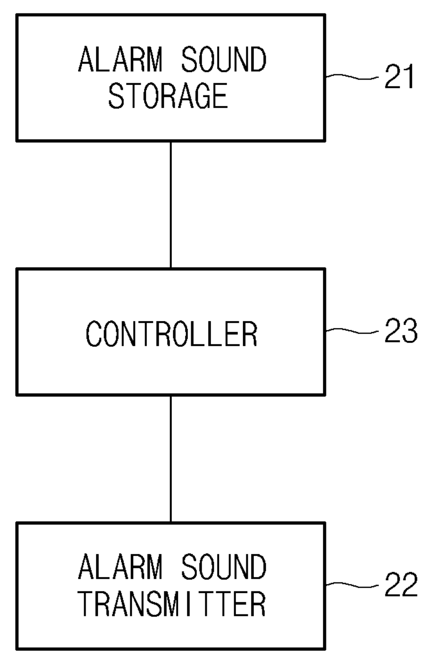
FIG. 2 is an exemplary block diagram illustrating a control device for a vehicle according to an exemplary embodiment of the present invention.

FIG. 2 is an exemplary block diagram illustrating a control device for a vehicle according to an exemplary embodiment of the present invention. As illustrated in FIG. 2, the control device for a vehicle may include an alarm sound storage 21, an alarm sound transmitter 22, and a controller 23.

Referring to the respective elements, first, the alarm sound storage 21 may be configured to store an alarm sound that provides information regarding an alert situation to a driver. The alarm sound transmitter 22 may be configured to transmit an alarm sound to the amplifier 20 or the cluster speaker 30 under the operation of the controller 23. When a vehicle network is activated, the controller 23 may be configured to determine whether amplifier installation information (AMP_INFORM_TO_IPM) has been transmitted from the amplifier 20 to detect whether the amplifier 20 is installed within a vehicle. When the amplifier 20 is installed therein, the controller 23 may be configured to operate the alarm sound transmitter 22 to transmit the alarm sound stored in the alarm sound storage 21 to the amplifier 20. When the amplifier 20 is not installed therein, the controller 23 may be configured to operate the alarm sound transmitter 22 to transmit the alarm sound stored in the alarm sound storage 21 to the cluster speaker 30.

In the present exemplary embodiment, a control system may include a lane departure warning system (LDWS), a side obstacle warning system (SOWS), a collision avoidance system, a lane keeping assist system (LKAS), a blind spot detection (BSD), a lane change assist (LCA) system, a smart parking assist system (SPAS), and the like. For example, when a vehicle departs from a lane, the LDWS may be configured to recognize an alert situation and output an alarm sound. In particular, when the vehicle departs from a left lane, the LDWS may be configured to output the alarm sound to a left speaker (e.g., one or more of left front speaker, left front door speaker, left rear door speaker, and left rear speaker), and when the vehicle departs from a right lane, the LDWS may be configured to output an alarm sound to a right speaker (e.g., one or more of right front speaker, right front door speaker, right rear door speaker, and right rear speaker).

In another example, when a different vehicle exists in the rear of the vehicle (e.g., a vehicle is traveling behind the vehicle in which the control system is installed), the SOWS may be configured to recognize an alert situation and output an alarm sound. In particular, when a different vehicle exists in a left rear side of the vehicle, the SOWS may be configured to output an alarm sound to a left speaker, and when the different vehicle exists in a right rear side of the vehicle, the SOWS may be configured to output an alarm sound to a right speaker.

Figure 3:
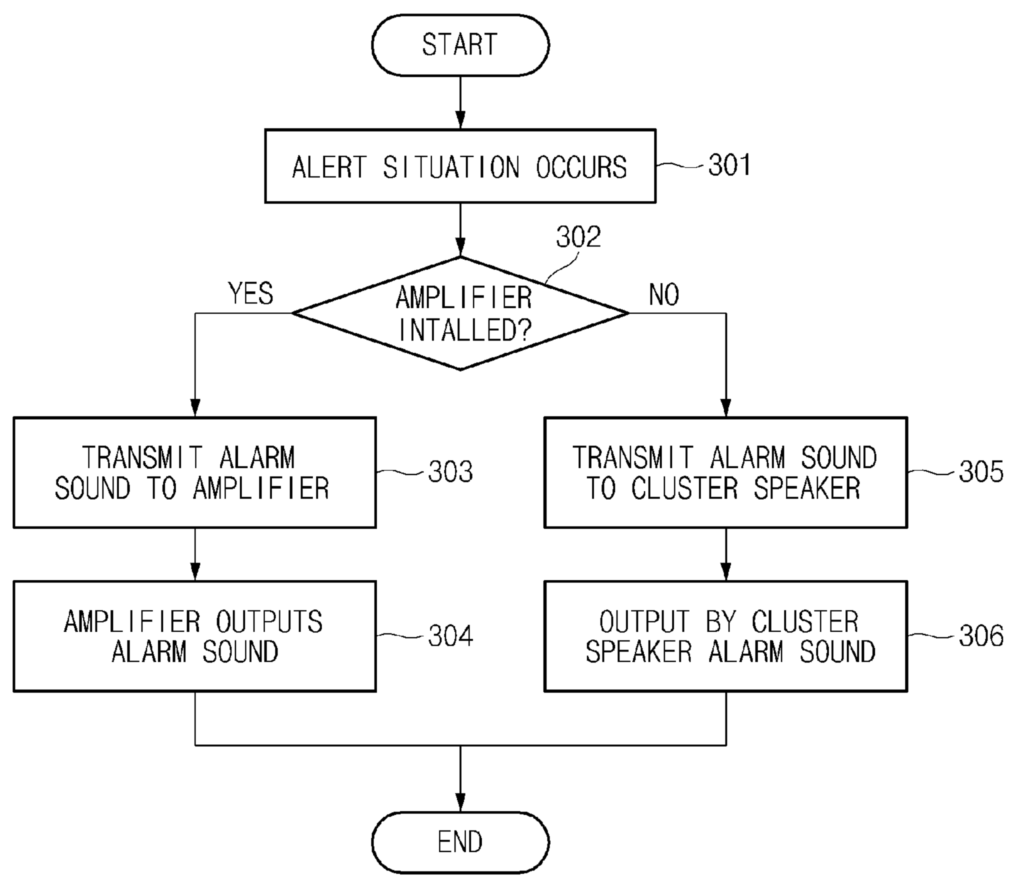
FIG. 3 is an exemplary flow chart illustrating an alarming method in a control system for a vehicle according to an exemplary embodiment of the present invention.

FIG. 3 is an exemplary flow chart illustrating an alarming method in a control system for a vehicle according to an exemplary embodiment of the present invention. First, when an alert situation occurs (301), the control device 10 may be configured to determine whether the amplifier 20 is installed within a vehicle (302). When the amplifier 20 is installed within the vehicle according to the determination result (302), the control device 10 may be configured to transmit an alarm sound to the amplifier 20 (303). Thereafter, the amplifier 20 may be configured to output an alarm sound (304). Meanwhile, when the amplifier 20 is not installed within the vehicle according to the determination result (302), the control device 10 may be configured to transmit an alarm sound to the cluster speaker 30 (305). Thereafter, the cluster speaker 30 may be configured to output an alarm sound (306). In other words, when an amplifier is installed within a vehicle, an alarm sound may be output via either a cluster speaker or the amplifier. The output of the alarm sound from the amplifier provides a clearer sound alarm to a driver since the alarm may be output in different speakers disposed at different locations within the vehicle depending on the type of alert situation.

According to the exemplary embodiment of the present invention, when an alert situation occurs, whether an amplifier is installed within a vehicle may be determined and an alarm sound may be output to the amplifier or a cluster speaker, thus providing an optimal alarm sound to a driver.

It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A control system for a vehicle having a warning function, the control system comprising:

a control device configured to:

determine whether an amplifier is installed within a vehicle according to an occurrence of an alert situation;

transmit an alarm sound to an amplifier when the amplifier is installed within the vehicle; and transmit the alarm sound to a cluster speaker when the amplifier is not installed within the vehicle, wherein the amplifier is configured to transmit amplifier installation information to the control device and output an alarm sound received from the control device, and wherein the cluster speaker is configured to output the alarm sound received from the control device.

2. The control device according to claim 1, wherein when amplifier installation information is received from the amplifier, the control device is configured to determine that the amplifier is installed within the vehicle, and in response to receiving no amplifier installation information from the amplifier, the control device is configured to determine that the amplifier is not installed within the vehicle.

3. The control device according to claim 1, wherein the amplifier is configured to output the alarm sound received from the control device via a particular speaker.

4. The control device according to claim 1, wherein the control device includes:

an alarm sound storage configured to store an alarm sound that provides information regarding an alert situation to a driver;

an alarm sound transmitter configured to transmit an alarm sound to the amplifier or the cluster speaker; and a controller configured to determine whether the amplifier is installed within the vehicle based on the amplifier installation information from the amplifier, operate the alarm sound transmitter to transmit an alarm sound to the amplifier when the amplifier is installed within the vehicle, and operate the alarm sound transmitter to transmit an alarm sound to the cluster speaker when the amplifier is not installed within the vehicle.

5. A control method for a vehicle having a warning function, the method comprising:

determining, by a controller, whether an amplifier is installed within the vehicle in response to determining an alert situation;

transmitting, by the controller, an alarm sound to the amplifier in response to determining that the amplifier is installed within the vehicle;

outputting, by the controller, the alarm sound via the amplifier;

transmitting, by the controller, the alarm sound to a cluster speaker in response to receiving no amplifier installation information; and outputting, by the controller, the alarm sound via the cluster speaker in response to receiving no amplifier installation information.

6. The method according to claim 5, wherein the determination of whether the amplifier is installed within the vehicle includes:

receiving, by the controller, amplifier installation information to determine that the amplifier is installed within the vehicle.

7. A non-transitory computer readable medium containing program instructions executed by a controller, the computer readable medium comprising:

program instructions that determine whether an amplifier is installed within the vehicle in response to determining an alert situation;

program instructions that transmit an alarm sound to the amplifier in response to determining that the amplifier is installed within the vehicle;

program instructions that output the alarm sound via the amplifier;

program instructions that transmit the alarm sound to a cluster speaker in response to receiving no amplifier installation information; and program instructions that output the alarm sound via the cluster speaker in response to receiving no amplifier installation information.

8. The non-transitory computer readable medium of claim 7, further comprising:

program instructions that output the alarm sound via a particular speaker based on a type of alert situation.

* * * * *